US012694047B2

(12) United States Patent

Guy

(10) Patent No.: US 12,694,047 B2

(45) Date of Patent: Jul. 28, 2026

(54) SEARCH FOR DATA-DRIVEN QUERY TO USE IN PROMPT TO A LARGE LANGUAGE MODEL

(71) Applicant: MICROSOFT TECHNOLOGY LICENSING, LLC., Redmond, WA (US)

(72) Inventor: Richard T Guy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 18/437,929

(22) Filed: Feb. 9, 2024

(65) Prior Publication Data

US 2025/0258849 A1     Aug. 14, 2025

(51) Int. Cl.
*G06F 16/3329* (2025.01)
*G06F 16/34* (2025.01)

(52) U.S. Cl.
CPC ........ *G06F 16/3329* (2019.01); *G06F 16/345* (2019.01)

(58) Field of Classification Search
None
See application file for complete search history.

(56) References Cited

U.S. PATENT DOCUMENTS

| | | | | |
|---|---|---|---|---|
| 2020/0372172 | A1* | 11/2020 | Murray | G06F 16/9024 |
| 2021/0319357 | A1* | 10/2021 | He | G06N 20/00 |
| 2025/0117573 | A1* | 4/2025 | Azose | G06N 20/00 |
| 2025/0173330 | A1* | 5/2025 | Durg | G06F 16/243 |
| 2025/0252097 | A1* | 8/2025 | Ng | G06F 16/24522 |
| 2025/0258848 | A1* | 8/2025 | Szabo | G06F 40/30 |

OTHER PUBLICATIONS

Karpas et al., "MRKL Systems" (Year: 2022).*

* cited by examiner

*Primary Examiner* — Paras D Shah
*Assistant Examiner* — Jacob B Vogt
(74) *Attorney, Agent, or Firm* — Seed Intellectual Property Law Group LLP

(57) ABSTRACT

A custom prompt is generated for a user of an application that illustrates a first user experience of a generative artificial intelligent (AI) feature incorporated into a chat bot of the application's user interface. The custom prompt includes a data-driven query verified to produce results on the user data. The generation of the custom prompt uses one or more large language models to predict an action that can be performed by the large language model with the user's data. When the action is verified to produce results on the user data that are on point with a given goal, the action becomes a data-driven query of a custom prompt. A summarization of initial results of the custom prompt are displayed with a "click all results" option. When the "click all results" option is selected, updated results are generated in real time by the large language model.

20 Claims, 9 Drawing Sheets

100

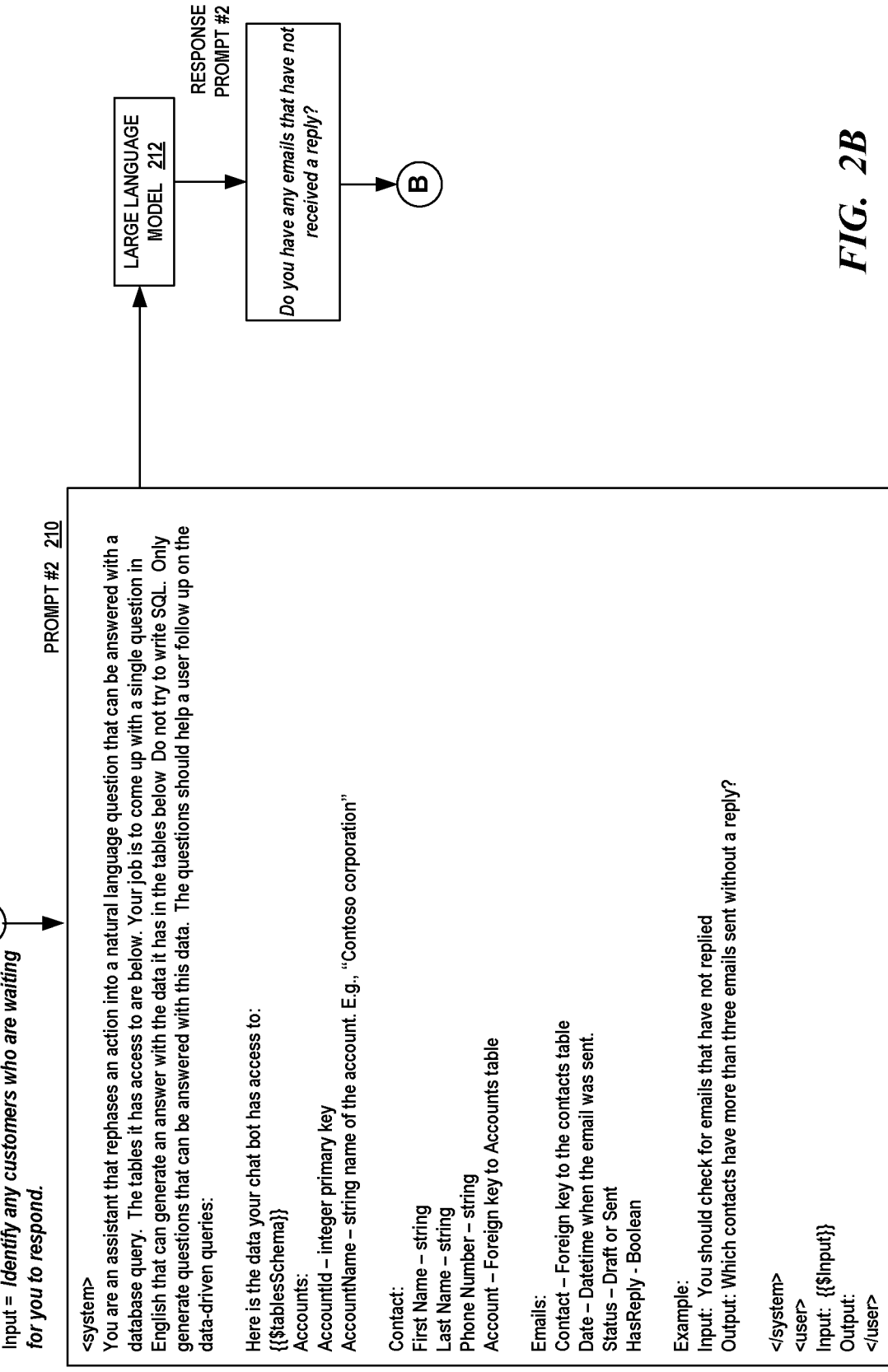

Ⓐ →

Input = *Identify any customers who are waiting for you to respond.*

PROMPT #2 210

<system>
You are an assistant that rephases an action into a natural language question that can be answered with a database query. The tables it has access to are below. Your job is to come up with a single question in English that can generate an answer with the data it has in the tables below Do not try to write SQL. Only generate questions that can be answered with this data. The questions should help a user follow up on the data-driven queries:

Here is the data your chat bot has access to:
{{$tablesSchema}}
Accounts:
AccountId – integer primary key
AccountName – string name of the account. E.g., "Contoso corporation"

Contact:
First Name – string
Last Name – string
Phone Number – string
Account – Foreign key to Accounts table Emails:
Contact – Foreign key to the contacts table
Date – Datetime when the email was sent.
Status – Draft or Sent
HasReply - Boolean Example:
Input: You should check for emails that have not replied
Output: Which contacts have more than three emails sent without a reply?

</system>
<user>
Input: {{$Input}}
Output:
</user>

LARGE LANGUAGE MODEL 212

→

RESPONSE TO PROMPT #2 214

*Do you have any emails that have not received a reply?*

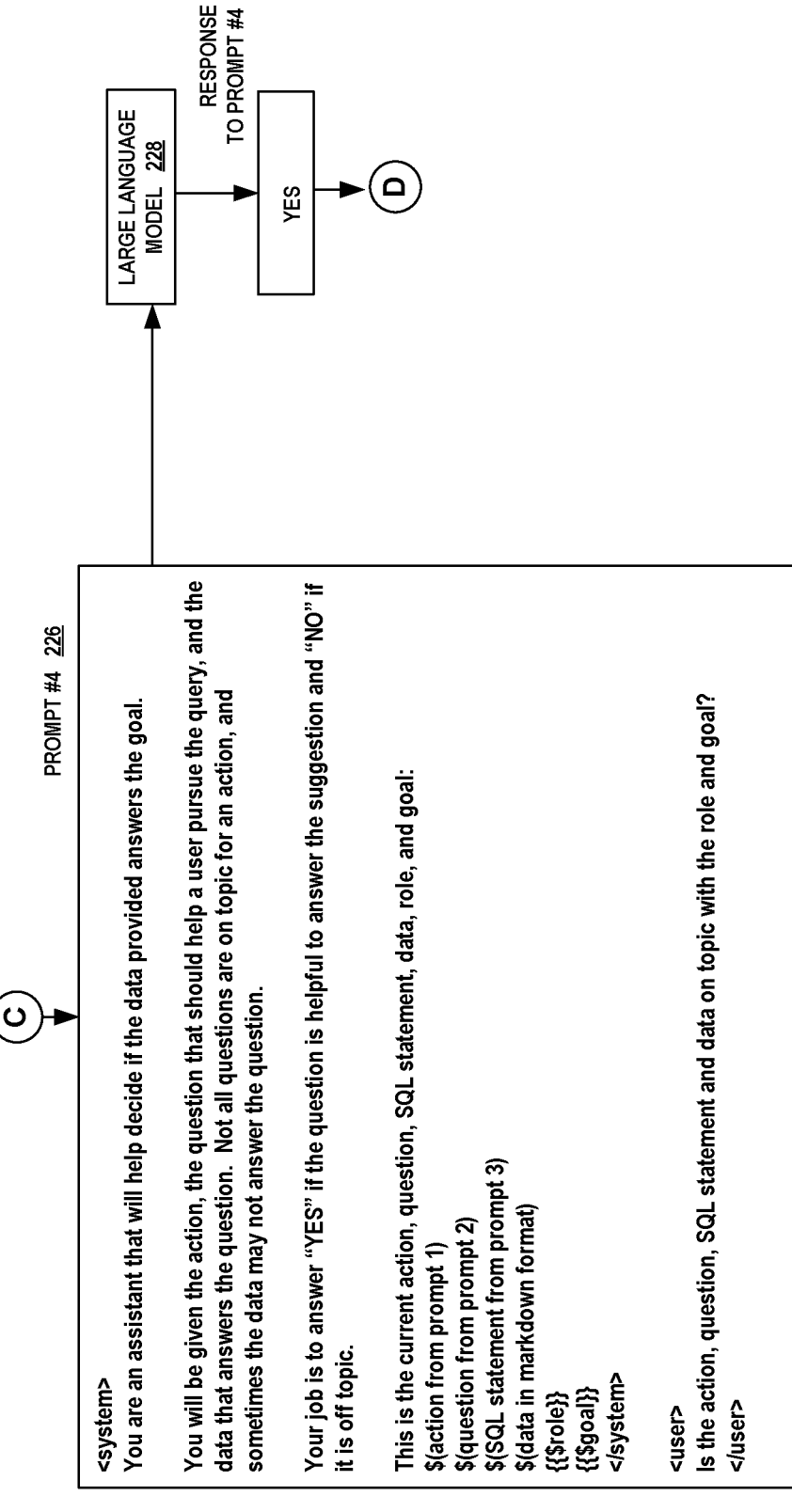

PROMPT #4  226

<system>
You are an assistant that will help decide if the data provided answers the goal.

You will be given the action, the question that should help a user pursue the query, and the data that answers the question. Not all questions are on topic for an action, and sometimes the data may not answer the question.

Your job is to answer "YES" if the question is helpful to answer the suggestion and "NO" if it is off topic.

This is the current action, question, SQL statement, data, role, and goal:
$(action from prompt 1)
$(question from prompt 2)
$(SQL statement from prompt 3)
$(data in markdown format)
{{$role}}
{{$goal}}
</system>

<user>
Is the action, question, SQL statement and data on topic with the role and goal?
</user>

LARGE LANGUAGE MODEL  228

RESPONSE TO PROMPT #4  230

YES

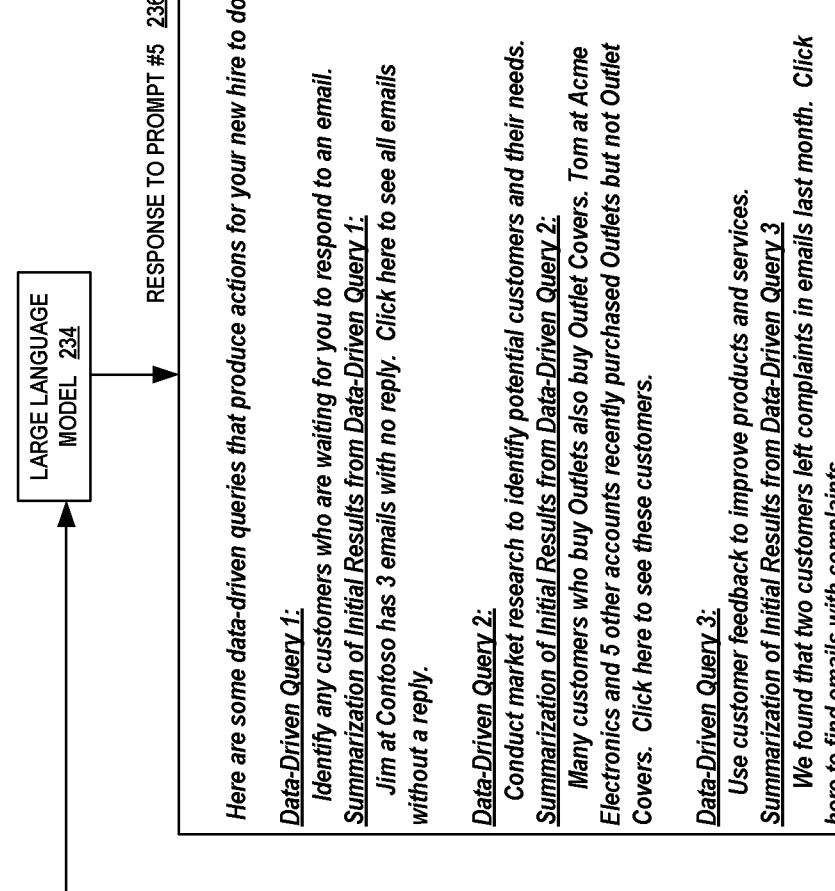

PROMPT #5  232

<system>
You are an assistant that summarizes each verified action.

For each verified action, rephrase with next steps that uses the data frame for the suggestion.

These are the verified actions:

${action 1 from prompt 1}
${data in markdown format from prompt 3}

${action 2 from prompt 1}
${data in markdown format from prompt 3}

${action 3 from prompt 1}
${data in markdown format from prompt 3}
</system>

<user>
Summarize all of the actions that were verified into a data-driven query. Be explicit and use the data for each data-driven query. Ensure each data-driven query has a call for all results that starts with "Click here."
</user>

LARGE LANGUAGE MODEL  234

RESPONSE TO PROMPT #5  236

Here are some data-driven queries that produce actions for your new hire to do.

*Data-Driven Query 1:*
*Identify any customers who are waiting for you to respond to an email.*
*Summarization of Initial Results from Data-Driven Query 1:*
   *Jim at Contoso has 3 emails with no reply. Click here to see all emails without a reply.*

*Data-Driven Query 2:*
*Conduct market research to identify potential customers and their needs.*
*Summarization of Initial Results from Data-Driven Query 2:*
   *Many customers who buy Outlets also buy Outlet Covers. Tom at Acme Electronics and 5 other accounts recently purchased Outlets but not Outlet Covers. Click here to see these customers.*

*Data-Driven Query 3:*
*Use customer feedback to improve products and services.*
*Summarization of Initial Results from Data-Driven Query 3*
   *We found that two customers left complaints in emails last month. Click here to find emails with complaints.*

*FIG. 2E*

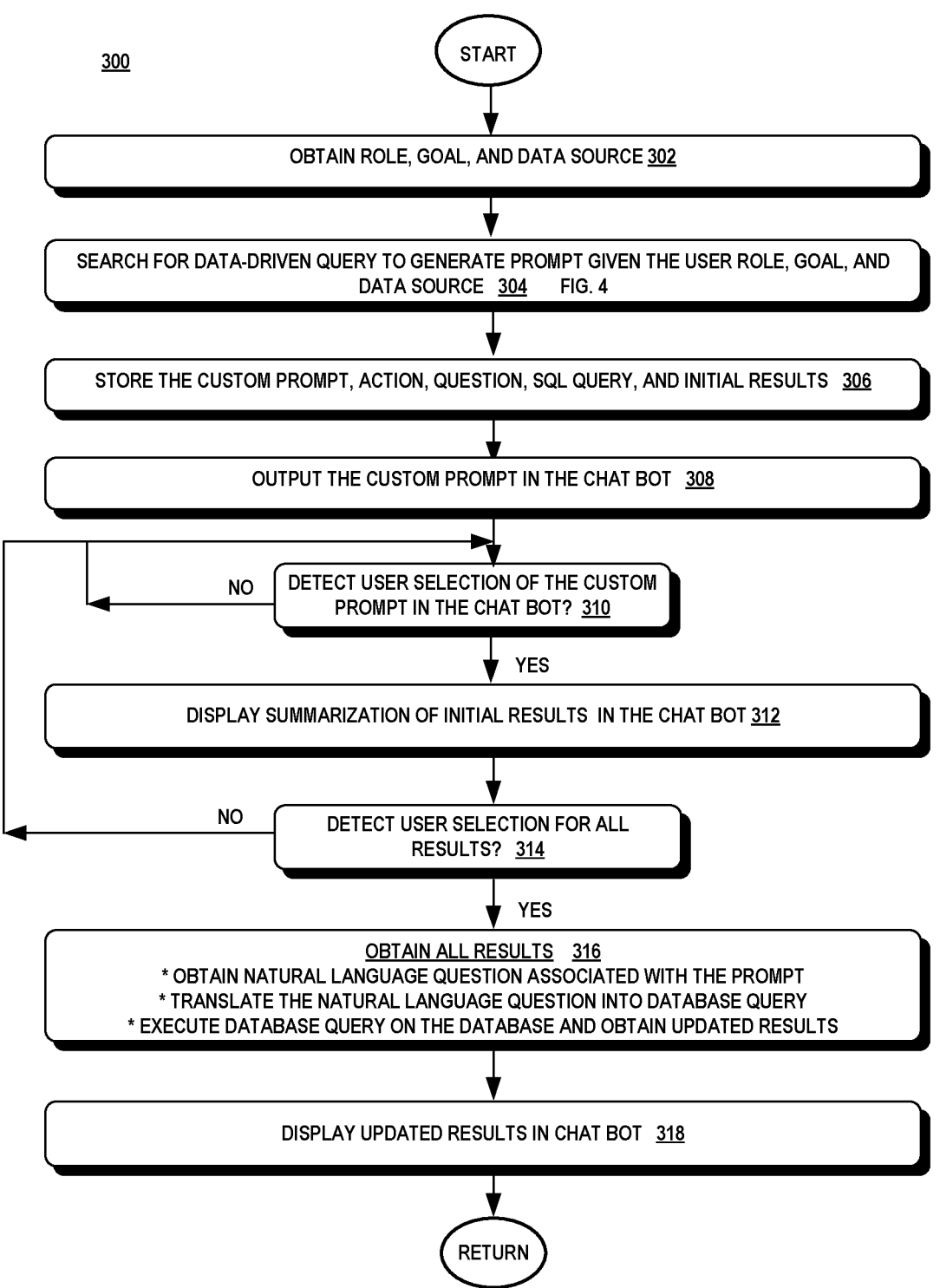

300

START

OBTAIN ROLE, GOAL, AND DATA SOURCE 302

SEARCH FOR DATA-DRIVEN QUERY TO GENERATE PROMPT GIVEN THE USER ROLE, GOAL, AND DATA SOURCE 304    FIG. 4

STORE THE CUSTOM PROMPT, ACTION, QUESTION, SQL QUERY, AND INITIAL RESULTS 306

OUTPUT THE CUSTOM PROMPT IN THE CHAT BOT 308

NO    DETECT USER SELECTION OF THE CUSTOM PROMPT IN THE CHAT BOT? 310

YES

DISPLAY SUMMARIZATION OF INITIAL RESULTS IN THE CHAT BOT 312

NO    DETECT USER SELECTION FOR ALL RESULTS? 314

YES

OBTAIN ALL RESULTS 316
* OBTAIN NATURAL LANGUAGE QUESTION ASSOCIATED WITH THE PROMPT
* TRANSLATE THE NATURAL LANGUAGE QUESTION INTO DATABASE QUERY
* EXECUTE DATABASE QUERY ON THE DATABASE AND OBTAIN UPDATED RESULTS

DISPLAY UPDATED RESULTS IN CHAT BOT 318

RETURN

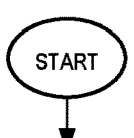

START

---

*PREDICT ACTIONS ON HOW TO ACHIEVE THE GOAL WITH THE USER'S DATA FOR A USER FUNCTIONING IN THE ROLE 402*

* GENERATE A FIRST PROMPT TO A LARGE LANGUAGE MODEL FOR  ACTIONS, WHERE THE MODEL IS GIVEN THE GOAL AND ROLE
* TRANSMIT THE FIRST PROMPT TO THE LARGE LANGUAGE MODEL AND OBTAIN ONE OR MORE  ACTIONS PREDICTED BY THE LARGE LANGUAGE MODEL

---

DO FOR EACH PREDICTED ACTION *404*

> *GENERATE A NATURAL LANGUAGE QUESTION   406*
> *GENERATE A SECOND PROMPT TO A  LARGE LANGUAGE MODEL FOR THE LARGE LANGUAGE MODEL TO PREDICT THE NATURAL LANGUAGE QUESTION GIVEN THE USER'S DATA SCHEMA
> *TRANSMIT THE SECOND PROMPT TO THE LARGE LANGUAGE MODEL AND OBTAIN THE QUESTION

> *TRANSLATE  NATURAL LANGUAGE QUESTION INTO DATABASE QUERY   408*
> *GENERATE A THIRD PROMPT TO A LARGE LANGUAGE MODEL FOR THE MODEL TO  PREDICT A DATABASE QUERY GIVEN THE QUESTION AND USER'S DATA SCHEMA
> *TRANSMIT THE THIRD PROMPT TO THE LARGE LANGUAGE MODEL AND OBTAIN THE DATABASE QUERY

> *EXECUTE THE DATABASE QUERY ON THE DATABASE, OBTAIN DATA, AND STORE RESULTS, QUESTION, AND PROMPT 410*

> *DETERMINE IF THE RESULT ACHIEVES THE GOAL   412*
> *GENERATE FOURTH PROMPT TO LARGE LANGUAGE MODEL TO DETERMINE IF THE RESULTS ACHIEVE THE GOAL, PROMPT INCLUDES THE ACTION, QUESTION, GENERATED SQL, AND DATA
> * TRANSMIT THE FOURTH PROMPT TO THE MODEL AND OBTAIN RESPONSE

> IF RESPONSE IS NOT VERIFIED, ELIMINATE  ACTION FROM CONSIDERATION.
> OTHERWISE, IF RESPONSE VERIFIED, KEEP ACTION AND RESULTS 414

---

*PRODUCE SUMMARIES OF EACH VERIFIED ACTION AND FORM CUSTOM PROMPT 416*
*GENERATE FIFTH PROMPT TO A LARGE LANGUAGE MODEL TO GENERATE SUMMARIES OF EACH VERIFIED ACTION
*CONSTRUCT CUSTOM PROMPT WITH ACTION AND SUMMARY WITH USER DATA
*STORE CUSTOM PROMPT AND USER DATA IN STORAGE

---

RETURN

*FIG. 4*

SEARCH FOR DATA-DRIVEN QUERY TO USE IN PROMPT TO A LARGE LANGUAGE MODEL

BACKGROUND

A user interface provides a user with a means to interact with a software product or application. The user interface typically contains graphical components such as menus, buttons, icons, tabs, scroll bars, pointers, windows, and other user controls. This graphical user interface (GUI) eliminates the need for a user to learn a text-based command interface that requires the user to type in long lines of code at a command line interface. The GUI is easier to use since the user can select a button or icon to execute a feature of the application. The goal of a user interface is to make the interaction with the application easy and efficient so that the user enjoys interacting with the application.

Some user interfaces do not include these graphical components and instead rely on a chat bot. A chat bot is a software program that interacts with a user of an application through a natural language conversation. However, the chat bot may not suffice as a viable user interface to the application. A user not familiar with interacting with a chat bot may not know how to engage in a conversation with the chat bot. In some situations, a chat bot may use pre-configured responses to a question or reply to a limited set of questions which may result in the user becoming frustrated with the application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A custom prompt is generated for a user of an application that illustrates a first user experience of a generative artificial intelligent (AI) feature incorporated into a chat bot of the application's user interface. The custom prompt contains a data-driven query to a generative AI model for the generative AI model to provide a response that acts on the user's data. The custom prompt is displayed in a chat bot as an illustrative example of the use of the generative AI model to perform actions that produce results with the user's data.

The custom prompt is tailored for a particular goal that encompasses the user's data when the user assumes a particular role. The generation of the custom prompt uses a large language model to predict actions on the user's data that achieve the goal when the user functions in the particular role. An action is then converted into a natural language question that is used to formulate a database query to obtain the user's data that is used by the action. The database query is executed to obtain the user's data that is used by the action. The action, natural language question, the database query, and user's data are then verified to ensure that the custom prompt works.

Upon successful verification, a custom prompt is generated which includes the verified action as the data-driven query. Initial results of the custom prompt are generated and stored with the custom prompt. The initial results are a summarization of the action that includes the user's data with an option for more detailed results. When the user selects the custom prompt, the summarization is displayed in the chat bot without the large language model executing the custom prompt. When the option for more detailed results is selected, then the large language model generates the most current results for the custom prompt which are displayed in the chat bot.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 2A-2E illustrate exemplary prompts to a large language model for the generation of the custom prompt and its corresponding response.

FIG. 3 is a flow chart illustrating an exemplary method of the system that generates and utilizes the data-driven query and custom prompt.

FIG. 4 is a flow chart illustrating an exemplary method for generating a custom prompt for a given role, goal and user data.

DETAILED DESCRIPTION

Overview

An application includes a chat bot having one or more custom prompts that demonstrate a first user experience with a large language model (i.e., generative AI model). The custom prompt contains a data-driven query. Initial results from the custom prompt which contain the user's data are generated and stored with the custom prompt. The user can click on the custom prompt which immediately returns a summarization of the initial results without the large language model executing the custom prompt.

A first user experience is a user's initial interaction with a feature or function of an application, such as the use of a chat bot that interacts with a large language model. A user without knowledge of how to utilize a large language model would need assistance in crafting a prompt to the large language model. Without the traditional graphical user interface components to assist the user, the user would likely have a disastrous first user experience. This would likely result in the user avoiding using the feature and/or the application. Instead, the user views a custom prompt and when the user clicks on the custom prompt, a summarization of the results from the custom prompt is returned which includes the user's data.

In order to construct the custom prompt, a search is made for actions that can be performed on the user's data that achieve a goal. A large language model is used to predict the actions given the format of the user's data, a target goal, and a user role. An action predicted by the large language model is then executed on the user's data and verified. Upon verification of the action and the resulting user data, a custom prompt is generated. The custom prompt includes the action as the data-driven query which is displayed in a user interface element (e.g., button) in the chat bot.

Upon the user selecting the custom prompt, the initial results are displayed in the chat bot without the large language model executing the custom prompt. The initial results include a summarization of the results that were previously generated. The summarization contains a user option to display all the results from the custom prompt. When the user option to display all the results is selected, the large language model is engaged to obtain the current results on the user data which is displayed in the chat bot.

Attention now turns to a more detailed description of the system, device, and methods for the search of a data-drive query and the construction of the custom prompt.

System

Figure 1:
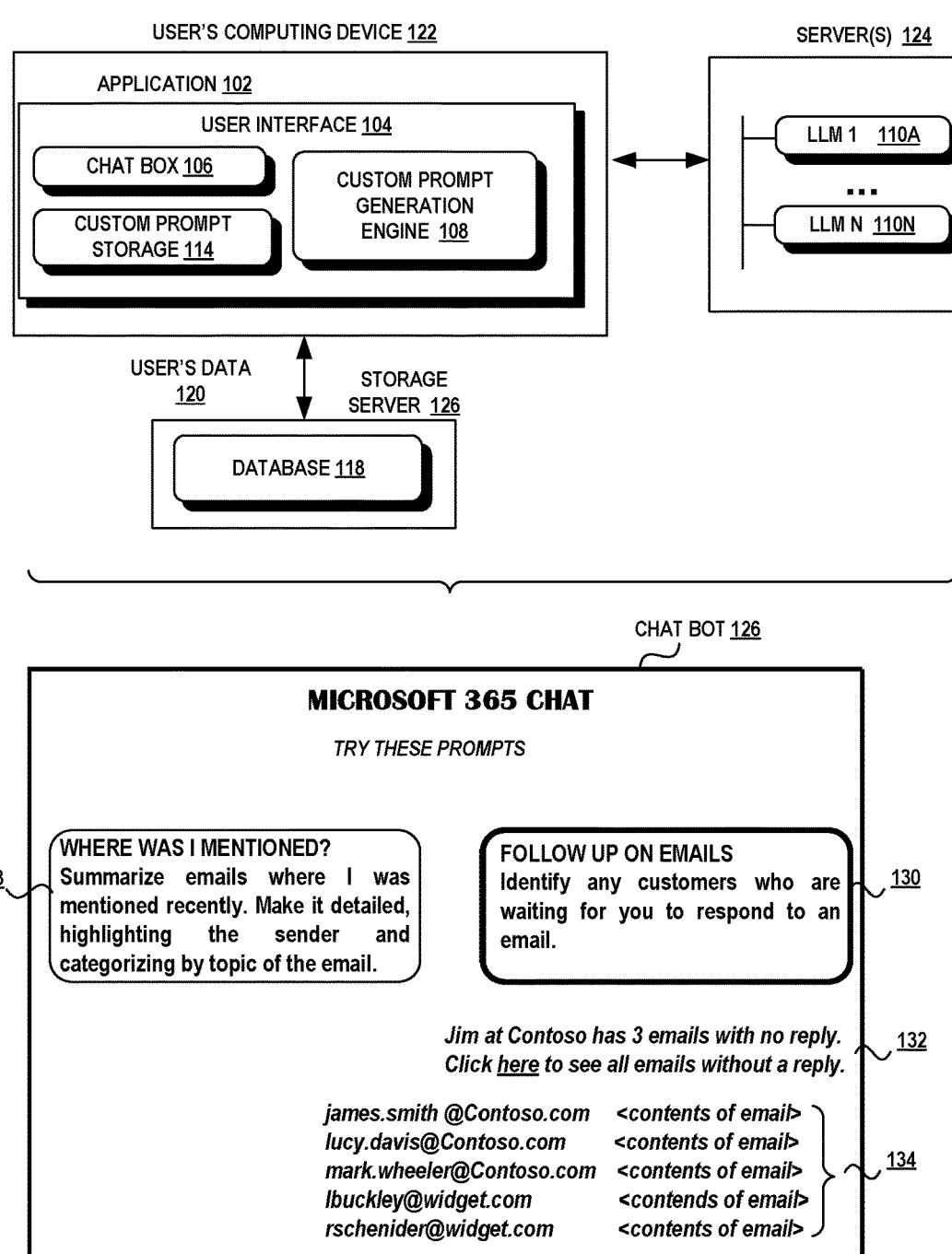
FIG. 1 illustrates an exemplary system for the generation and usage of a data-driven query for use as a prompt to a large language model.

FIG. 1 illustrates an exemplary system 100 for generating a custom prompt returning data-driven results. In an aspect, the system 100 includes an application 102 having a user interface 104 that utilizes a chat bot 106. The chat bot 106 provides exemplary prompts that provide a first user experience to the generative AI models, such as language models 110A-110N. The chat bot 106 includes a custom prompt generation engine 108 that generates exemplary prompts that are customized for a user to demonstrate the usefulness of the large language models. The custom prompts and associated data are stored in the custom prompt storage 114.

In an aspect, the application 102 is a customer support or service application, such as without limitation, a customer relationship management (CRM) software application, Microsoft's Dynamics 365 Customer Service Enterprise, or other applications that supports or maintains user or customer data. The application 102 uses the chat bot 106 to generate a natural language conversation with a user which is like a human conversation. A custom prompt contains a query that is answered using the user's data 120 stored in a database 118.

A large language model (LLM1-LLMn) 110A-110N is a type of machine learning model trained on a massively-large training dataset of text and/or source code and contains billions of parameters. The large language model is used to perform various tasks such as natural language processing, text generation, machine translation, and source code generation. The large language model is formed from deep learning neural networks such as a neural transformer model with attention. Examples of the large language models include the conversational pre-trained generative neural transformer models with attention offered by OpenAI (i.e., ChatGPT and Codex models), PaLM and Chinchilla by Google, and LLaMa by Meta.

The neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep machine learning differs from traditional machine learning since it uses multiple stages of data processing through many hidden layers of a neural network to learn and interpret the features and the relationships between the features. Deep machine learning embodies neural networks which differs from the traditional machine learning techniques that do not use neural networks. There are various types of deep machine learning models, such as recurrent neural network (RNN) models, convolutional neural network (CNN) models, long short-term memory (LSTM) models, and neural transformers with attention.

The training of a large language model requires a considerable amount of training data and computing resources which makes it impossible for some developers to create their own models. In an aspect, access to some large language models is offered on a fee basis which may differ based on the specific model accessed. For example, OpenAI offers access to several generative pre-trained transformer (GPT) models with various price points. The models differ based on the model size which is relative to the number of parameters the model uses. An application interacts with a model through various application programming interfaces (API).

In an aspect, the custom prompt generation engine 108 utilizes various large language models 110A-110N based on a model's computational burden, latency, processing hardware needs and capabilities. Models having a smaller model size, measured in the number of parameters, are often less costly than models having a large model size. Models with specific capabilities, such as fine-tuned on a particular task, may have an increased computational burden than models pre-trained on general tasks.

The configuration of a model may be a factor in the computational burden in using the model. A neural transformer model with attention is typically configured with a number and type of transformer blocks. For example, a model may be configured with only encoder blocks, with only decoder blocks, or with encoder-decoder blocks. Each configuration may differ in the number of transformer blocks used which is also a factor in the computational burden in using the model.

In an aspect, the application 102 is located on a user's computing device 122. The large language models 110A-110N are located on one or more servers 124. The database is located on a storage server 126. In one aspect, the custom prompt engine 108 is a software component that can be a plug-in, add-on, component or feature of the chat bot 106. Alternatively, the custom prompt engine 108 may be located in a server 124 housing the large language models 110A-110N.

A large language model is typically given a user prompt that consists of text in the form of a question, an instruction, short paragraph and/or source code, where the prompt instructs the model to perform a task given data and/or indicates the format of the intended response. In an aspect, the server and the user computing device communicate through HTTP-based Representational State Transfer (REST) Application Programming Interfaces (API). A REST API or web API is an API that conforms to the REST protocol. In the REST protocol, the server contains a publicly-exposed endpoint having a defined request and response structure expressed in a JavaScript Object Notation (JSON) format. An application in the user computing device, such as a web browser or other web application, issues web APIs containing the user prompt to the server to instruct the large language model to perform an intended task.

FIG. 1 illustrates an exemplary chat bot 126 containing custom prompt 128 and custom prompt 130. Custom prompt 128 represents a prompt to a large language model for the large language model to summarize the emails in which the user was mentioned recently. Custom prompt 130 represents a prompt to a large language model for the large language model to determine where there have not been any responses to the user's emails. In an aspect, the custom prompts 128, 130 are contained in a user interface element, such as a button.

When a user clicks on the button for custom prompt 130, a summarization of the results is immediately shown in the chat bot. For example, as shown in FIG. 1, when the user clicks on custom prompt 130, a summarization of the results 132 appears in the chat box 126. The user may click again on the "Click here to see all emails without a reply" which then updates the results with all of the emails that are outstanding at the time the click is made and displays them in the chat bot 134.

Figure 2A:
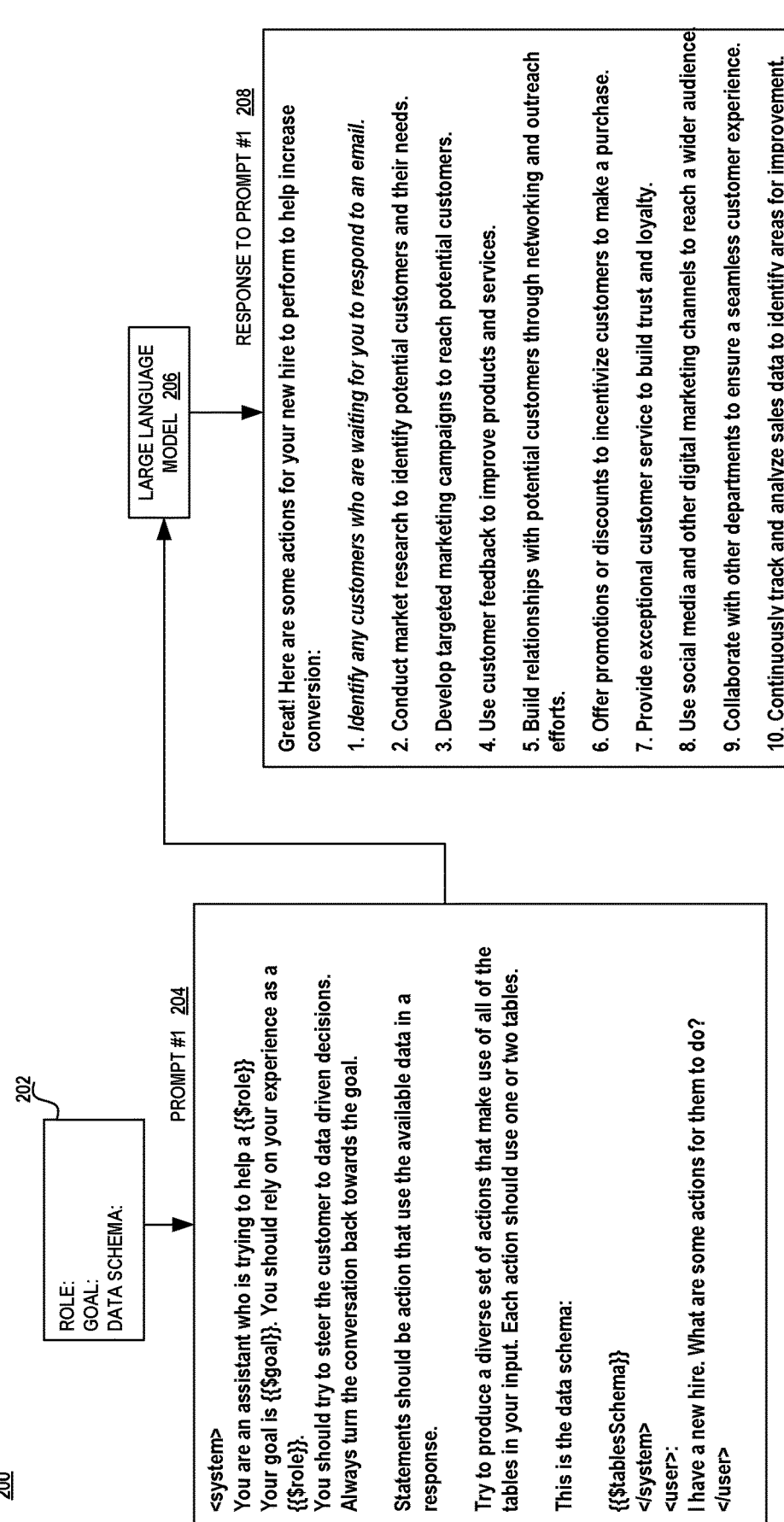

FIGS. 2A-2E illustrate exemplary prompts used to generate a custom prompt. FIG. 2A illustrates an initial prompt where a large language model is used to predict one or more actions that operate on the user's data and which achieve a user's goal when the user is acting in a target role.

When the user engages with the chat bot of an application, a role, goal, and user credentials 202 are obtained. The role is the function that the user assumes while using the application. In the case where the application is a customer support or service application, the role may include customer support agent, sales agent, customer service manager, etc. A goal is a result that the user desires to achieve for a given role. The user's credentials are used to access the user's data to create the custom prompt. The user's credentials are used to obtain access to a database that stores the user's data.

The role and goal may be associated with a particular application. For example, for a CRM application where the emphasis is on generating new customer leads, the role may be preconfigured to a sales associate and the goal may be to capture new leads and to guide them through the sales process. Alternatively, the role and goal may be generated from historical data derived from the user's past usage with the application. The application may be associated with a profile that indicates the user's job function. The user's past usage with the application may indicate the past goals the user used with the application.

The user credentials are used to access the user's data. The user credentials may include a link to the source of the user's data and the user's password. Alternatively, the user credentials may be obtained from the user's profile with the application.

The initial prompt 204 includes a context enclosed in the <system> . . . </system> tags and a task enclosed in the <user> . . . </user> tags. The context provides the large language model with a description of the task, examples of the task, and/or a format of the response. The task may consist of a question that defines the task the model is to perform. For the example shown in FIG. 2A, the initial prompt 204 includes a context that describes the task that achieves the goal using the user's data. The goal is for the model to "produce a diverse set of actions that make use of all of the tables in your input. Each action should use one or two tables." The data schema is $tablesSchema. The task is for the model to predict actions for a new hire to do based on achieving the goal where the predicted actions use the user's data.

The initial prompt 204 is sent to a large language model 206 which generates a response 208. The response 208 includes ten actions predicted by the large language model. A custom prompt may be generated for an action once it is verified. In some instances, an action may be discarded if it is not verified or does not utilize the user's data.

Turning to FIG. 2B, there is shown a second exemplary prompt for a large language model to generate a natural language question that can be answered with the user's data and which achieves the goal 210. The input to the prompt 210 is the action, "Identify any customers who are waiting for you to respond."

In this prompt 210, the large language model is given a context that includes a description of the task, the data schema or format of the user's data, and examples of the task. The prompt 210 is transmitted to a large language model 212 which generates the natural language question 214. Here, the model predicts the natural language question, "Do you have any emails that have not been received a reply?" for the action "Identify any customers who are waiting for you to respond" for the goal "I have a new hire. What are some suggested actions for them to do?"

Figure 2C:
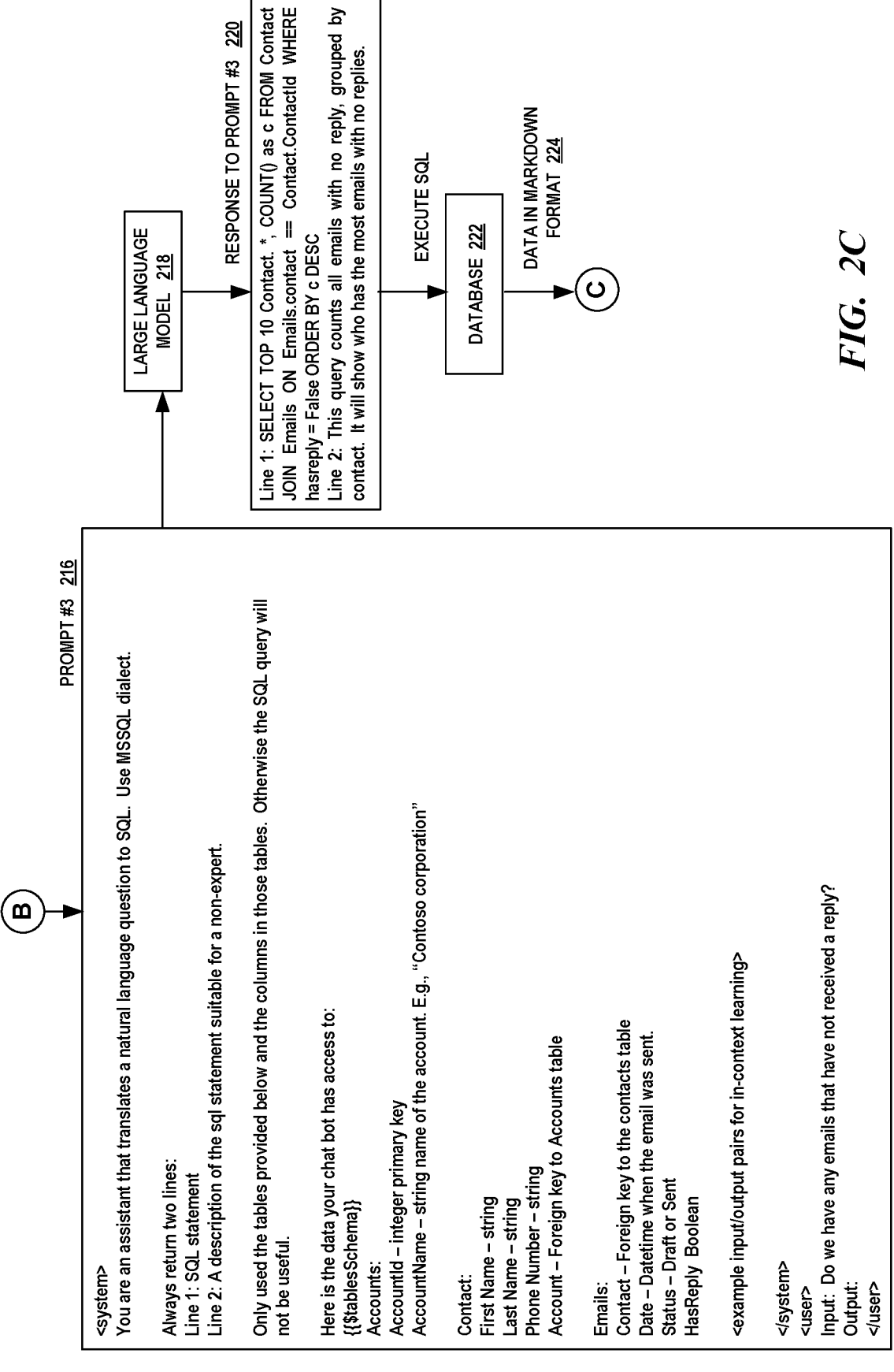

Turning to FIG. 2C, there is shown a third exemplary prompt 216 for the large language model to construct an SQL query for the natural language question generated in the response to the second prompt. The prompt 216 includes a context that includes instructions, the format of the output, and the natural language question generated from the second prompt. The prompt 216 is transmitted to a large language model 218 which generates a response 220 includes a SQL statement. The SQL statement is executed against the database 222 and the resulting data is output in a markdown format 224. A markdown format structures the data in a format that is easy to read.

Turning to FIG. 2D, there is shown a fourth exemplary prompt 226 where a large language model is used to determine whether the action predicted by the large language model, the natural language question, the SQL statement, and the retrieved data are on topic with the goal and role. In this example, the model verifies that the action, the natural language question, the SQL statement, and the retrieved data achieves the goal. The prompt is sent to a large language model 228 and the model 228 responds with a YES or NO 230.

In the example shown in FIG. 2D, the context within the <system>/</system> tags include the model's instructions and the data for the model's use. This includes the action from prompt 1, "Identify any customers who are waiting for you to respond", the question from prompt 2, "Do you have any emails that have not received a reply?", the SQL statement from prompt 3, "SELECT TOP 10 Contact.*, COUNT( ) as c FROM Contact JOIN Emails ON Emails.contact==Contact.ContactTD WHERE hasreply False ORDER by c DESC", the data in the markdown format, the role which is sales associate, and the goal is "I have a new hire. What are some suggested actions for them to do?"

The task for the model is to verify that the action, question, SQL statement, and data are on topic with the role and goal. The model responds with a YES answer 230.

Turning to FIG. 2E, there is shown an exemplary prompt 232 for a large language model 234 to generate a summary for each action that was verified. For the example shown in FIG. 2E, actions 1-3 were verified although the model in FIG. 2A predicted ten actions. Actions which did not utilize the user's data were discarded such as action 7—"Provide exceptional customer service to build trust and loyalty" and action 8—"Use social media and other digital marketing channels to reach a wider audience."

The large language model 234 produces a summarization for each verified action in the response to prompt #5. A custom prompt is generated using the verified action as a data-driven query. Each data-driven query is associated with a summarization of the initial results returned from a large language model responding to the data-driven query. The summarization contains an "all results" option which was selected, uses a large language model to generate a complete current list of all the data results.

As shown in FIG. 2E, in the response to prompt #5 236, there are three actions that are formed into a data-driven query of a custom prompt: data-driven query 1; data-driven query 2; and data-driven query 3. Each data-driven query is associated with a summarization of the initial results which were verified.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Turning to FIG. 3, there is shown an exemplary method 300 for the generation of a custom zero query and results. Initially, a role, goal, and data credentials are obtained (block 302). The role is the function that the user assumes while using the application. The goal is a result that the user desires to achieve for a given role. The user's credentials are used to access the user's data that satisfies the goal. The role and goal may be generated from historical data derived from the user's past usage with the application or generated from the user' application profile that indicates the user's job function. The user credentials are used to access the user's data. The user credentials may include a link to the source of the user's data and the user's password. Alternatively, the user credentials may be obtained from the user's profile with the application.

Next, a search is made for data-driven queries that can be used to generate a custom prompt to a large language model for a given role, goal and user's data (block 304). The custom prompt and its associated action, question, SQL query, and initial results are stored in the custom prompt storage (block 306). The custom prompt is then output in the chat bot in a user interface element (e.g., button, icon, etc.) for user selection (block 308).

Upon the chat bot detecting a user selection of a particular custom prompt (block 310—yes), the chat bot obtains the summarization of the initial results associated with the custom prompt which is displayed in the chat bot (block 312). The custom prompt may contain a link to a location of the initial results associated with the custom prompt which is then displayed in the chat bot. Otherwise (block 310—no), the process waits for user input.

Upon the user selecting the "all results" option (block 314—yes), the process obtains updated results for the custom prompt (block 316). The question used to form the data-driven query of the custom prompt is obtained from the custom prompt storage and issued to a large language model to generate the SQL query to obtain the current data (block 316). The SQL query is then executed to obtain all the results associated with the custom prompt (block 316) which are then displayed in the chat bot (block 318).

FIG. 4 illustrates an exemplary method for searching for a data-driven query. In an aspect, different large language models are used to perform a particular task in the construction of the custom zero query. The use of each model is associated with a cost and an objective in generating a custom zero query is to minimize the cost. For this reason, different models are used for the different tasks depending on the task and the cost of the use of the model.

Given a goal and role, the custom prompt generation engine predicts actions to achieve the goal which utilize the user's data for a user functioning in the role (block 402).

This is a difficult task to predict and a model having an advanced reasoning capability that can solve difficult problems with greater accuracy is selected. A prompt is generated that includes a description of the task which is to predict an action that achieves the goal for a user functioning in the role and the data format or schema of the user's data associated with the application. The prompt is transmitted to a first large language model which predicts one or more actions. The predicted actions are returned in the model's response.

For each action predicted by the model (block 404), the custom prompt generation engine performs the steps in blocks 406 through 414 to find an action that leads to a data-driven query for a custom prompt.

The action predicted by the first large language model is then formulated into a natural language question that can be used to find the user data that is used in the action (block 406). The question is predicted by a second large language model having a less expensive cost than the first large language model. The second large language model may have a smaller model size than the first large language model thereby having a lower usage cost. Alternatively, the second large language model may be fine-tuned for the natural language question task from a model pre-trained on natural language understanding. A fine-tuning dataset of paired samples consisting of an action and a corresponding natural language question is used to fine-tune a pre-trained model on the natural language question task.

The prompt to the second large language model includes a set of instructions, the data format or schema of the user's data, an optional example, and the task formatted as a user query (block 406). The prompt is transmitted to the second large language model which returns a natural language question.

The natural language question is then translated into a database query (block 408). In an aspect, the natural language query is translated into a structure query language (SQL) query. The custom prompt generation engine creates a prompt to a third large language model that comprises instructions describing the task, the data format of the user's data, optional examples for in-context learning, and the task in the form of a user question. The prompt is sent to the third large language model and the model returns a response that includes the predicted SQL statement based on the given natural language question. The task of translating a natural language question into a database query is considered a difficult task which uses a model having an advanced reasoning capability that can solve difficult problems with greater accuracy, such as OpenAI's Generative Pre-training Transformer GPT-4 and/or GPT-5.

Next, the custom prompt generation engine executes the database query on the database to obtain the user data associated with the action (block 410).

The custom prompt generation engine then verifies that the action, question, database query, and user data achieve the goal (block 412). This is important to ensure that data-driven query of the custom prompt is a viable prompt. A fourth large language model is used to verify that the combination of the action, question, database query, and the user data consumed by the action achieves the goal (block 412). The prompt is sent to the fourth large language model which returns a response.

If the response indicates that the combination of the action, question, database query, and user data consumed by the action does not achieve the goal, then the action is deleted (block 414). If the response indicates that the combination of the action, question, database query and user data consumed by the action achieves the goal, then the action is considered as a data-driven query for a custom prompt (block 414).

A custom prompt is then created for each verified action (block 416). The custom prompt includes the verified action as the data-driven query. The custom prompt generation engine generates a prompt to a large language model for the model to generate a summary or description of the data-driven query with initial results on the user data. The summarization includes a "click here for all results" link that is used to generate a current listing of all the results that are produced from execution of the custom prompt.

Exemplary Operating Environment

Figure 5:
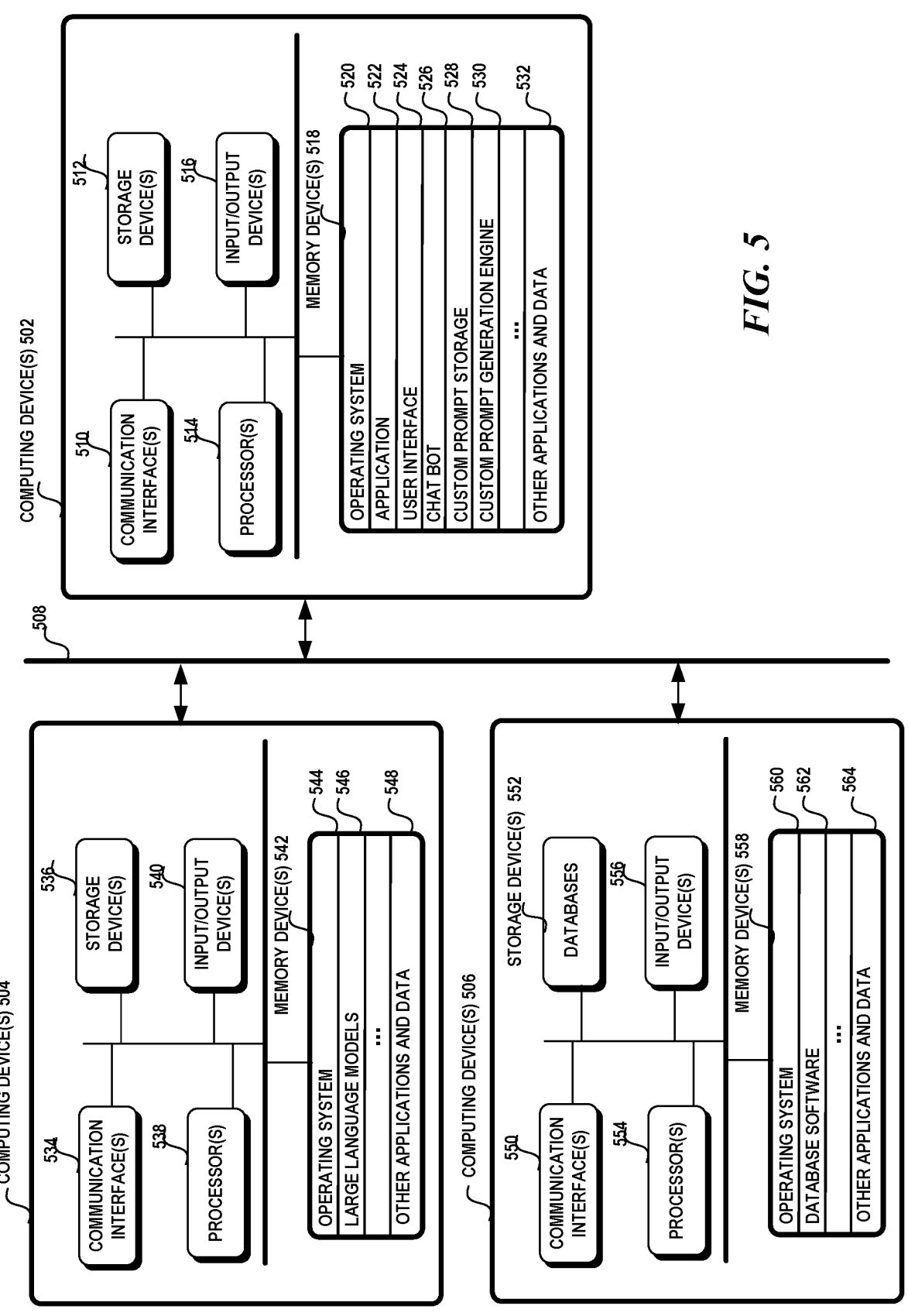
FIG. 5 is a block diagram illustrating an exemplary operating environment.

Attention now turns to a discussion of an exemplary operating environment. FIG. 5 illustrates an exemplary operating environment 500. In one embodiment, the operating environment includes a first computing device that hosts the application, a second computing device that hosts the database containing the user's data, a third computing device that hosts the large language models and a network that enables communications between the different computing devices. In alternate embodiments, the operating environment may be configured differently with the large language models hosted on the same computing device that hosts the software application and/or the database containing the user's data. It should be noted that the techniques described herein are not constrained to a particular configuration of the operating environment.

The operating environment 500 includes computing device 502 hosting the software application, computing device 504 hosting the large language models, and computing device 506 hosting one or more databases. The computing devices 502, 504, 506 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 500 may be configured in a network environment, a distributed environment, a multi-processor environment, or a stand-alone computing device having access to remote or local storage devices.

A computing device 502, 504, 506 may include one or more processors 514, 538, 554, one or more communication interfaces 510, 534, 550, one or more storage devices 512, 536, 552, one or more input/output devices 516, 540, 556, and one or more memory devices 518, 542, 558. A processor 514, 538, 554 may be any commercially available or customized processor and may include dual microprocessors and multi-processor architectures. A communication interface 510, 534, 550 facilitates wired or wireless communications between the computing device and other devices. A storage device 512, 536, 552 may be a computer-readable medium that does not contain propagating signals, such as modulated data signals transmitted through a carrier wave. Examples of a storage device 512, 536, 552 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 512, 536, 552 in a computing device 502, 504, 506. The input/output devices 516, 540, 556 may include a keyboard, mouse, pen, voice input device, touch input device, display, speakers, printers, etc., and any combination thereof.

A memory device or memory 518, 542, 558 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 518, 542, 558 may also include one or more external storage devices or remotely located storage devices that do not pertain to propagated signals, such as modulated data signals transmitted through a carrier wave.

A memory device 518, 542, 558 contains instructions, components, and data. A component is a software program that performs a specific function and is otherwise known as a module, program, component, and/or application. Memory device 518 includes an operating system 520, an application 522, a user interface 524, a chat bot 526, a custom zero query storage 528, a custom zero query generation engine 530, and other applications and data 532. Memory device 542 includes an operating system 544, several large language models 546, and other applications and data 548. Memory device 558 includes an operating system 560, database software 562 used to retrieve data from a database, and other applications and data 564.

The network 508 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 508 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed is an improvement to the functioning of a computer. In an aspect, the techniques described herein generate a user interface component for a chat bot that provides a first user experience for a user in using a generative AI feature of the chat bot. The technical feature associated with addressing this problem is the construction of a custom prompt that demonstrates the usage of the large language model to perform tasks on the user's data. The technical effect achieved is efficient use of the chat bot feature thereby improving the functioning of the computer.

CONCLUSION

The techniques described herein pertain to the generation of a custom prompt having been verified to perform a task to produce results with the user's data that improves the functioning of a computer over conventional solutions. Conventional solutions may use an empty chat bot that leaves the user confused as to what can be typed into the empty chat bot. Alternatively, the chat bot may utilize pre-configured responses that are not tailored to the user's data or perform tasks applicable to the user. The custom prompt demonstrates the use of the large language model on verified actions that can be performed with verified results on the user's data.

One of ordinary skill in the art understands that the techniques disclosed herein are inherently digital. The human mind cannot interface directly with a CPU or network interface card, or other processor, or with RAM or other digital storage, to read or write the necessary data and perform the necessary operations disclosed herein.

The embodiments are also presumed to be capable of operating at scale, within tight timing constraints in production environments (e.g., integrated development environment), and in testing labs for production environments as opposed to being mere thought experiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A system is disclosed, comprising: a processor; and a memory that stores a program configured to be executed by the processor. The program comprises instructions that when executed by the processor performs acts that: generate a custom prompt for a user of a software application and initial results of the custom prompt, wherein the software application monitors user data of the user, wherein the custom prompt simulates execution of a data-driven query to be performed by a large language model to produce the initial results that include the user data.

The generation of the custom prompt comprises instructions that when executed by the processor perform acts that: search for an action that achieves a target goal with the user data; obtain the user data that is used by the action to achieve the target goal; verify that the action and the user data used by the action meets the target goal; upon verification that the action and the user data used by the action meets the target goal, create a custom prompt for the user and initial results, wherein the custom prompt comprises the verified action as the data-driven query, wherein the initial results comprise a summarization of the user data used by the action, wherein the initial results are obtained without execution of the custom prompt; display the custom prompt in a chat bot of the software application; and upon user selection of the custom prompt, output the initial results in the chat bot.

In an aspect, the search for the action that achieves the target goal with the user data comprises instructions that when executed by the processor performs acts that: create a first prompt for the large language model to predict the action given the target goal, data schema of the user data, and a user role; and obtain the action predicted from the large language model.

In an aspect, obtain the user data that is used by the action to achieve the target goal comprises instructions that when executed by the processor performs acts that: create a second prompt for the large language model to predict a natural language question for use in obtaining the user data used by the action, wherein the second prompt comprises the action and data schema of the user data; and obtain the natural language question from the large language model.

In an aspect, the program comprises instructions that when executed by the processor performs acts that: create a third prompt for the large language model to predict a database query that executes the natural language question, wherein the third prompt comprises the action and the natural language question; and obtain the database query from the large language model.

In an aspect, the program comprises instructions that when executed by the processor performs acts that: execute the database query to obtain the user data used by the action. In an aspect, verify that the action and the user data used by the action meets the target goal comprises instructions that when executed by the processor performs acts that: create a fourth prompt for the large language model to verify that the action and the user data used by the action achieves the target goal, wherein the fourth prompt comprises the action, the natural language questions, the database query and the user data used by the action.

In an aspect, the summarization of the user data used by the action comprises a selection option for all results of the user data to be displayed, wherein the program comprises instructions that when executed by the processor performs acts that: upon user input to the selection option, obtain all the user data that satisfies the data-driven query; and display the all the user data that satisfies the data-driven query in the chat bot.

A computer-implemented method is disclosed comprising: accessing a chat bot of a user interface of a software application, wherein the software application controls user data of a user of the software application, wherein the chat bot interacts with a large language model for the large language model to respond to a given query, wherein the chat bot interacts with a database containing the user data; generating a custom prompt simulates execution of a data-driven query by the large language model on the user data, wherein generating the custom prompt further comprises: producing an action that achieves a target goal on the user data; obtaining the user data that responds to the action; verifying that the action and the user data that responds to the action achieve the target goal; creating the custom prompt to include the verified action as the data-driven query; and creating a summarization of the user data that responds to the data-driven query from the verified user data that responds to the action; displaying the custom prompt in the chat bot; and upon user input selecting the custom prompt, displaying the summarization of the user data that responds to the data-driven query without the large language model executing the custom prompt.

In an aspect, the computer-implemented method, further comprises: wherein the summarization of the user data that responds to the data-driven query comprises a request for all of the user data that responds to the verified action, upon detection of user input selecting the request for all of the user data that responds to the verified action, obtaining current user data that responds to the verified action; and displaying the current user data that responds to the verified action in the chat bot.

In an aspect, wherein obtaining the current user data that response to the verified action further comprises: creating a first prompt to the large language model for the large language model to generate a database query that obtains the current user data that responds to the action; and execute the database query to obtain the current user data that responds to the action.

In an aspect, wherein producing the action that achieves the target goal on the user data further comprises: creating a second prompt to the large language model for the large language model to predict the action that achieves the goal, wherein the second prompt comprises the goal, data schema of the user data, and the action.

In an aspect, the computer-implemented method further comprises: creating a third prompt to the large language model for the large language model to predict a natural language question for use in obtaining the user data that responds to the action, wherein the third prompt comprises the goal, the data schema of the user data, and the action.

In an aspect, the computer-implemented method, further comprises: creating a fourth prompt to the large language model for the large language model to predict a database query that obtains the user data that responds to the action, wherein the fourth prompt comprises the action, the natural language question, and data schema of the user data; and execute the database query to obtain the user data that responds to the action.

In an aspect, the computer-implemented method further comprises: creating a fifth prompt to the large language model for the large language model to generate a summarization of the user data that responds to the verified action, wherein the fifth prompt comprises the action and the user data that responds to the action; and obtain the summarization of the user data that responds to the verified action from the large language model.

In an aspect, the computer-implemented method further comprises: wherein the large language model is a neural transformer model with attention.

A hardware storage device is disclosed having stored thereon computer executable instructions that are structured to be executable by a processor of a computing device to thereby cause the computing device to perform actions that: access a chat bot for a software application, wherein the software application manages user data, wherein the chat bot interfaces a user of the software application with a large language model, wherein the chat bot interfaces with a database storing the user data; obtain an action that achieves a given goal on the user data; extract the user data that is used by the action to achieve the given goal; verify that the action and the user data that is used by the action achieve the given goal; upon verification that the action and the user data that is used by the action achieve the given goal, create a custom prompt and initial results, wherein the custom prompt comprises the action as a data-driven query, wherein the initial results comprise a summarization of the user data that responds to the data-driven query; output the custom prompt in the chat bot; and upon user selection of the custom prompt, output the summarization of the user data that responds to the data-driven query without the large language model executing the custom prompt.

In an aspect, wherein obtain the action that achieves the given goal on the user data performs actions that: obtain from the large language model the action that achieves the given goal on the user data, wherein the large language model is given instructions to predict the action for the given goal for the user functioning in a given role.

In an aspect, wherein extract the user data that is used by the action to achieve the given goal performs actions that: obtain from the large language model a natural language question for use in finding the user data for the action, wherein the large language model is given the action and a data format of the user data.

In an aspect, the hardware storage device has stored thereon computer executable instructions that are structured to be executable by a processor of a computing device to thereby cause the computing device to perform actions that: obtain from the large language model a database query for use in finding the user data for the action, wherein the large language model is given the action, the data format of the user data, and the natural language question.

In an aspect, the hardware storage device has stored thereon computer executable instructions that are structured to be executable by a processor of a computing device to thereby cause the computing device to perform actions that: obtain from the large language model the summarization of the user data that responds to the data-driven query, wherein the large language model is given the action, the natural language question, the database query and the user data that responds to the data-driven query.

What is claimed:
1. A system, comprising:
a processor; and
a memory that stores a program configured to be executed by the processor, the program comprising instructions that when executed by the processor performs acts that:
generate a custom prompt for a user of a software application and initial results of the custom prompt, wherein the software application monitors user data of the user, wherein the custom prompt simulates execution of a data-driven query to be performed by a large language model by precomputing and storing, prior to user selection, the initial results that include the user data, wherein the generation of the custom prompt comprises instructions that when executed by the processor perform acts that:
search for an action that achieves a target goal with the user data;
obtain the user data that is used by the action to achieve the target goal by:
creating a prompt for the large language model to predict a natural language question for use in obtaining the user data used by the action, wherein the prompt comprises the action and data schema of the user data;
providing the prompt to the large language model; and
obtaining the natural language question from the large language model;
verify that the action and the user data used by the action meet the target goal;
upon verification that the action and the user data used by the action meet the target goal, create a custom prompt for the user and initial results, wherein the custom prompt comprises the verified action as the data-driven query, wherein the initial results comprise a summarization of the user data used by the action, wherein the initial results are obtained without execution of the custom prompt;
display the custom prompt in a chat bot of the software application; and upon user selection of the custom prompt, output the stored initial results in the chat bot without transmitting the custom prompt to the large language model.

2. The system of claim 1, wherein the search for the action that achieves the target goal with the user data comprises instructions that when executed by the processor performs acts that:

create a first prompt for the large language model to predict the action given the target goal, data schema of the user data, and a user role; and obtain the action predicted from the large language model.

3. The system of claim 1, wherein the large language model that predicts the natural language question is fine-tuned using a dataset of paired samples including an action and a corresponding natural language question.

4. The system of claim 1, wherein the program comprises instructions that when executed by the processor performs acts that:

create a second prompt for the large language model to predict a database query that executes the natural language question, wherein the second prompt comprises the action and the natural language question; and obtain the database query from the large language model.

5. The system of claim 4, wherein the program comprises instructions that when executed by the processor performs acts that:

execute the database query to obtain the user data used by the action.

6. The system of claim 5, wherein verifying that the action and the user data used by the action meets the target goal comprises instructions that when executed by the processor performs acts that:

create a third prompt for the large language model to verify that the action and the user data used by the action achieves the target goal, wherein the third prompt comprises the action, the natural language questions, the database query and the user data used by the action.

7. The system of claim 1, wherein the summarization of the user data used by the action comprises a selection option for all results of the user data to be displayed, wherein the program comprises instructions that when executed by the processor performs acts that:

upon user input to the selection option, obtain all the user data that satisfies the data-driven query; and display all the user data that satisfies the data-driven query in the chat bot.

8. A computer-implemented method comprising:

accessing a chat bot of a user interface of a software application, wherein the software application controls user data of a user of the software application, wherein the chat bot interacts with a large language model for the large language model to respond to a given query, wherein the chat bot interacts with a database containing the user data;

generating a custom prompt that simulates execution of a data-driven query by the large language model on the user data, wherein generating the custom prompt further comprises:

producing an action that achieves a target goal on the user data;

obtaining the user data that responds to the action by:

creating a prompt for the large language model to predict a natural language question for use in obtaining the user data that responds to the action, wherein the prompt comprises the action and data schema of the user data;

providing the prompt to the large language model; and obtaining the natural language question from the large language model;

verifying that the action and the user data that responds to the action achieve the target goal;

creating the custom prompt to include the verified action as the data-driven query; and creating a summarization of the user data that responds to the data-driven query from the verified user data that responds to the action;

precomputing and storing the summarization prior to user input selecting the custom prompt;

displaying the custom prompt in the chat bot; and upon user input selecting the custom prompt, displaying the stored summarization of the user data that responds to the data-driven query without transmitting the custom prompt to the large language model.

9. The computer-implemented method of claim 8, further comprising:

wherein the summarization of the user data that responds to the data-driven query comprises a request for all of the user data that responds to the verified action;

upon detection of user input selecting the request for all of the user data that responds to the verified action, obtaining current user data that responds to the verified action; and displaying the current user data that responds to the verified action in the chat bot.

10. The computer-implemented method of claim 9, wherein obtaining the current user data that response to the verified action further comprises:

creating a first prompt to the large language model for the large language model to generate a database query that obtains the current user data that responds to the action; and execute the database query to obtain the current user data that responds to the action.

11. The computer-implemented method of claim 8, wherein producing the action that achieves the target goal on the user data further comprises:

creating a second prompt to the large language model for the large language model to predict the action that achieves the goal, wherein the second prompt comprises the goal and data schema of the user data.

12. The computer-implemented method of claim 8, wherein the prompt comprises the target goal.

13. The computer-implemented method of claim 8, further comprising:

creating a second prompt to the large language model for the large language model to predict a database query that obtains the user data that responds to the action, wherein the second prompt comprises the action, the natural language question, and data schema of the user data; and executing the database query to obtain the user data that responds to the action.

14. The computer-implemented method of claim 8, wherein the large language model is a neural transformer model.

15. The computer-implemented method of claim 8, wherein the large language model is a neural transformer model with attention.

16. A hardware storage device having stored thereon computer executable instructions that are structured to be executable by a processor of a computing device to thereby cause the computing device to perform actions that:

access a chat bot for a software application, wherein the software application manages user data, wherein the chat bot interfaces a user of the software application with a large language model, wherein the chat bot interfaces with a database storing the user data;

obtain an action that achieves a given goal on the user data;

extract the user data that is used by the action to achieve the given goal by:

creating a prompt for the large language model to predict a natural language question for use in obtaining the user data used by the action, wherein the prompt comprises the action and data schema of the user data;

providing the prompt to the large language model; and obtaining the natural language question from the large language model;

verify that the action and the user data that is used by the action achieve the given goal;

upon verification that the action and the user data that is used by the action achieve the given goal, create a custom prompt and initial results, wherein the custom prompt comprises the action as a data-driven query, wherein the initial results comprise a summarization of the user data that responds to the data-driven query, wherein the initial results are precomputed and stored prior to user selection;

output the custom prompt in the chat bot; and upon user selection of the custom prompt, output the stored summarization of the user data that responds to the data-driven query without transmitting the custom prompt to the large language model.

17. The hardware storage device of claim 16, wherein obtaining the action that achieves the given goal on the user data performs actions that:

obtain from the large language model the action that achieves the given goal on the user data, wherein the large language model is given instructions to predict the action for the given goal for the user functioning in a given role.

18. The hardware storage device of claim 16, wherein extracting the user data that is used by the action to achieve the given goal performs actions that:

obtain from the large language model a natural language question for use in finding the user data for the action, wherein the large language model is given the action and a data format of the user data.

19. The hardware storage device of claim 18 having stored thereon computer executable instructions that are structured to be executable by a processor of a computing device to thereby cause the computing device to perform actions that:

obtain from the large language model a database query for use in finding the user data for the action, wherein the large language model is given the action, the data format of the user data, and the natural language question.

20. The hardware storage device of claim 16 having stored thereon computer executable instructions that are structured to be executable by a processor of a computing device to thereby cause the computing device to perform actions that:

obtain from the large language model the summarization of the user data that responds to the data-driven query.

* * * * *